(12) United States Patent
Kalman

(10) Patent No.: US 9,184,430 B2
(45) Date of Patent: Nov. 10, 2015

(54) BATTERY PACK FOR INTEGRATING MULTIPLE SINGLE BATTERIES

(76) Inventor: Andrew E. Kalman, San Francisco, CA (US)

(*) Notice: Subject to any disclaimer, the term of this patent is extended or adjusted under 35 U.S.C. 154(b) by 470 days.

(21) Appl. No.: 13/323,474

(22) Filed: Dec. 12, 2011

(65) Prior Publication Data
US 2012/0148877 A1 Jun. 14, 2012

Related U.S. Application Data

(60) Provisional application No. 61/422,530, filed on Dec. 13, 2010.

(51) Int. Cl.
H01M 2/10 (2006.01)
H01M 2/20 (2006.01)
H01M 10/04 (2006.01)
H01M 10/42 (2006.01)

(52) U.S. Cl.
CPC .............. *H01M 2/202* (2013.01); *H01M 2/105* (2013.01); *H01M 10/0481* (2013.01); *H01M 10/425* (2013.01)

(58) Field of Classification Search
None
See application file for complete search history.

(56) References Cited

U.S. PATENT DOCUMENTS

| 4,091,186 A * | 5/1978 | Ott et al. ........................ 429/157 |
| 4,091,187 A * | 5/1978 | Kaye .............................. 429/159 |
| 6,627,345 B1 | 9/2003 | Zemlok et al. |
| 2002/0027758 A1 * | 3/2002 | Oglesbee et al. .............. 361/104 |
| 2004/0197642 A1 | 10/2004 | Sato |
| 2008/0241667 A1 * | 10/2008 | Kohn ................... H01M 2/1016 429/159 |
| 2008/0274639 A1 * | 11/2008 | Sikora ........................... 439/522 |
| 2010/0062329 A1 * | 3/2010 | Muis .............................. 429/158 |
| 2010/0255355 A1 | 10/2010 | Park et al. |
| 2011/0045321 A1 * | 2/2011 | Park et al. ......................... 429/7 |

FOREIGN PATENT DOCUMENTS

| KR | 10-2010-0028335 A | 3/2010 |
| WO | WO 2009069943 A2 * | 6/2009 |

* cited by examiner

*Primary Examiner* — Patrick Ryan
*Assistant Examiner* — Lucas J O Donnell
(74) *Attorney, Agent, or Firm* — Donald R. Boys; Central Coast Patent Agency, Inc.

(57) ABSTRACT

A battery integration module or pack includes a first positioning plate for positioning the multiple single batteries in formation for integration at one end of the battery formation, a second positioning plate for positioning the multiple single batteries in formation for integration at the opposite end of the battery formation, the first and second plates aligned together over the formation of batteries to form a battery holder frame, a first printed circuit board (PCB) mounted to the outside surface of the first positioning plate, and a second printed circuit board (PCB) mounted to the outside surface of the second positioning plate. The first and or second printed circuit boards include conductive contact surfaces accessible to the battery terminals of the multiple single batteries in formation wherein contact between the contact surfaces of the printed circuit boards and the battery terminals is mitigated by intermediate conductive components.

11 Claims, 3 Drawing Sheets

BATTERY PACK FOR INTEGRATING MULTIPLE SINGLE BATTERIES

CROSS-REFERENCE TO RELATED DOCUMENTS

The present invention claims priority to a U.S. provisional patent application Ser. No. 61/422,530 entitled "Methods for Capturing and Electrically Connecting to Cylindrical Batteries", filed on Dec. 13, 2010, the entire disclosure of which is incorporated herein at least by reference.

BACKGROUND OF THE INVENTION

1. Field of the Invention

The present invention is in the field of electronics and pertains particularly to methods and apparatus for integrating multiple batteries to form a battery pack.

2. Discussion of the State of the Art

In the field of electronics, newer lithium-based batteries, both primary (non-rechargeable) and secondary (rechargeable) have been developed that have much higher energy density ratings than the standard Nickel Cadmium (NiCd) or Nickel Metal Hydride (NiMH). At the time of this writing, there are a few varieties of Lithium-based batteries. These are Lithium Ion (Li-Ion) batteries and Lithium Ion Polymer (LiPo) batteries. Li-Ion batteries are typically provided in the form of a cylindrical cell. LiPo batteries are typically provided in the form of a prismatic or rectangular cell. Both Li-Ion and LiPo have similar battery chemistry with 3.7V/cell being the nominal voltage. These batteries require certain handling criteria to help avoid safety concerns such as over current, over voltage, and under voltage conditions. Failure to heed handling and charging instructions may result in a fire.

A battery may comprise of one or more cells of a given battery chemistry. For example, a 3.7V Li-Ion battery consists of a single Li-Ion cell. A 7.4V Li-Ion battery consists of two Li-Ion cells, and so on. Li-Ion cells are usually fabricated within a cylindrical metal component. Standard sizes may vary but include the 18650 model size of 18 mm diameter×65 mm in length. These batteries include an integral blow-off valve to handle over pressure due to overcharging.

Cylindrical Li-Ion cells may be provided with or without connection tabs. Connection tabs are generally soldered or spot-laser-welded to each end of the battery. LiPo battery cells are fabricated in a variety of shapes and sizes. These batteries are often used in portable power applications where a custom battery shape is beneficial or necessary, such as with a smart phone, an iPad, an iPod, or the like. Prismatic cells are packaged in a sealed plastic-type 'bag' enclosure. Prismatic cells are always supplied with two connection tab terminals, a positive terminal and a negative terminal.

Lithium batteries must be handled with care at all times as described further above. The basic critical limits per battery cell are battery over-voltage and battery charge and discharge currents. Lithium-based battery cells lack any protection circuits. One terminal, typically the positive terminal, is taped over or otherwise insulated at the point of sale to prevent any sort of electrical contact with anything that might conduct a current. A short between the positive and negative terminals of a Li-Ion or LiPo cell may immediately result in a short circuit, large currents, and possibly fire.

Therefore, what is clearly needed is a battery integration module or pack that solves the above limitations while providing safe access to electrical power.

SUMMARY OF THE INVENTION

The problem stated above is that integration of multiple single batteries into a more powerful battery pack is desirable in many instances, but many of the conventional means for integrating multiple battery cells, such as by direct coupling of the battery terminals of multiple batteries to a conductive path on a printed circuit board of an electronics device, also create security issues relative to safety of use of such battery integration modules or packs. The inventors therefore considered functional components of a battery integration module, looking for elements that exhibit interoperability that could potentially be harnessed to provide downforce but in a manner that would not create safety concerns while in use.

Every battery integration module is propelled by internal security in position and contact propensity, one by-product of which is an abundance of single cell batteries function as on more powerful battery. Most such battery integration modules employ soldered or hardwired connection to a printed circuit board to conduct the current from each battery in a grouping of batteries along a common current path to one or more electronic circuits, and printed circuit boards and battery packaging are typically a part of such apparatus.

The present inventor realized in an inventive moment that if, at the point of use, batteries in a battery integration module could be more safely isolated from one another and external contact points in more modular fashion, significant upgrade in usability might result. The inventor therefore constructed a unique battery integration module for integrating multiple single cell batteries that allowed in series and/or in parallel integration, but constrained conductive coupling of the battery terminals to an intermediate and passive conductive component. A significant improvement in usability results, with no impediment to power accessibility created.

Accordingly, in an embodiment of the present invention, A battery pack for integrating multiple batteries includes a first positioning plate having a length, width and thickness for positioning the batteries in formation for integration at one end of the formation, a second positioning plate having a length, width, and thickness similar or identical to that of the first positioning plate, the second positioning plate for positioning the batteries in formation for integration at the opposite end of the formation, the first and second positioning plates aligned and secured over the formation of batteries to form a battery holder frame for constraining the batteries into the formation for integration, a first printed circuit board (PCB) mounted to the outside surface of the first positioning plate; and a second printed circuit board (PCB) mounted to the outside surface of the second positioning plate, wherein the first and or second printed circuit boards include conductive contact surfaces accessible to the battery terminals of the batteries in formation, and wherein contact between the contact surfaces of the printed circuit boards and the battery terminals is mitigated by intermediate conductive components.

In a preferred embodiment, the first and second positioning plates are fabricated from a non-conductive material. In one embodiment, the intermediate conductive components are springs. In this embodiment, the springs are constrained to position between battery terminals and the conductive contact surfaces on the PCBs by recesses strategically provided in the first and second positioning plates, the springs making contact with a battery terminal at one end, and a PCB contact surface at the opposite end.

In one embodiment, the batteries are interconnected in parallel. In another embodiment, the batteries are connected in series. In a preferred embodiment, the battery holder frame is assembled using spacers and machine screws, wherein spring compression on the intermediate conductive components is mitigated by torque applied by tightening the frame together. In one embodiment, diode OR circuits are employed in the PCB electronics to polarize the current path to ensure a unidirectional placement of the batteries into formation for integration.

In one embodiment, the conductive intermediate components are compressible clips or shims fabricated of steel spring stock. In one embodiment, the battery pack further includes one or more conductive or non-conductive heat sinks, the heat sinks isolated from battery terminals. In one embodiment, the contact surfaces of the PCBs are gold plated. In a preferred embodiment, the battery pack further includes heat protection and monitoring circuitry on the PCBs for each battery. In this embodiment, the heat protection and monitoring circuitry includes a fuse. In a variation of this embodiment, the fuse is a positive temperature coefficient (PTC) fuse. In another variation of the embodiment, the fuse is a diode.

BRIEF DESCRIPTION OF THE DRAWING FIGURES

DETAILED DESCRIPTION

The inventors provide a unique battery integration module, also termed a battery pack that enables safer integration of multiple batteries. The present invention will be described in enabling detail using the following examples, which may describe more than one relevant embodiment falling within the scope of the present invention.

Figure 1:
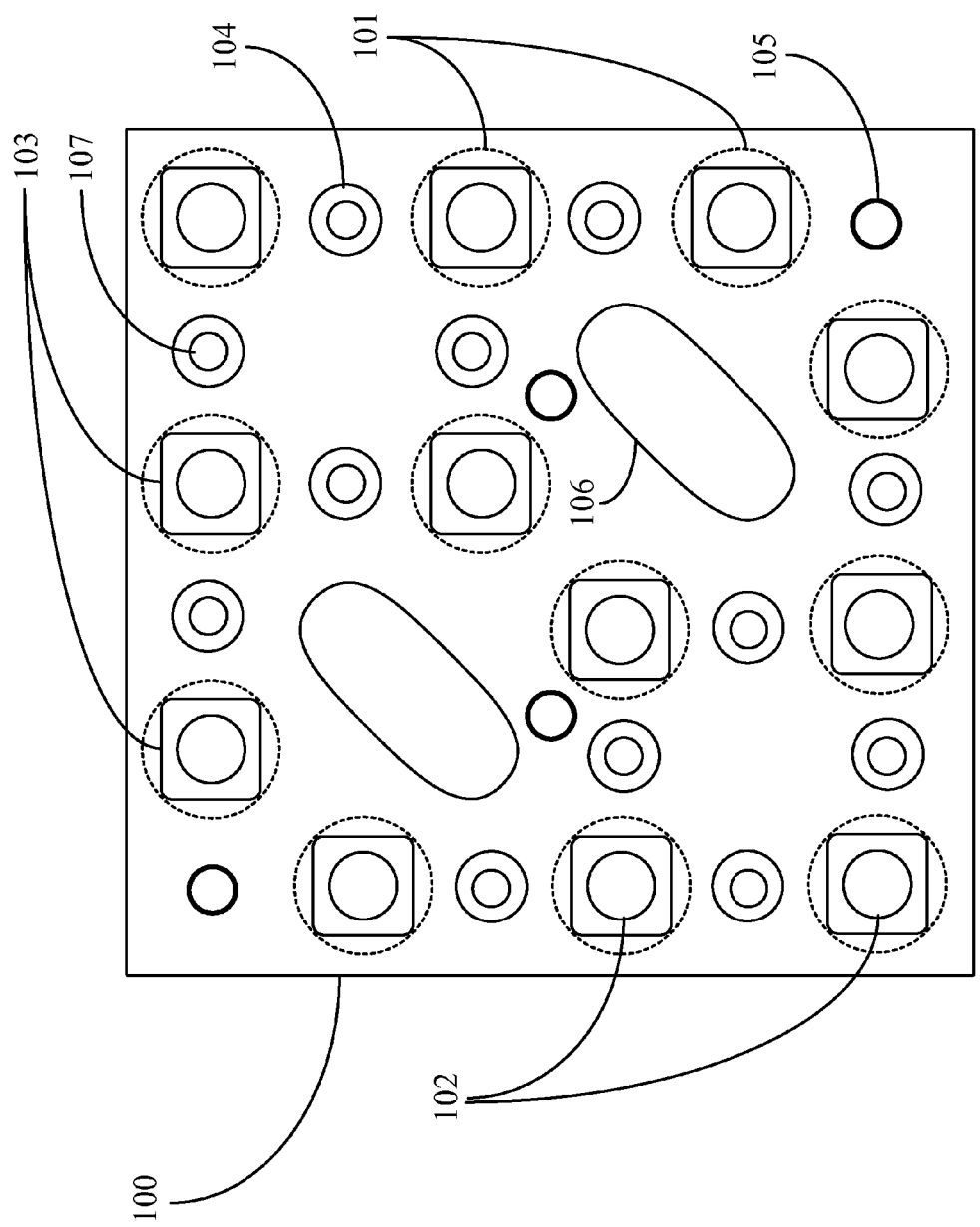
FIG. 1 is a top view of a battery positioning plate for a battery integration module according to an embodiment of the present invention.

FIG. 1 is a top view of a battery positioning plate 100 for a battery integration module according to an embodiment of the present invention. Positioning plate 100 represents one of two opposing plates provided to position batteries for integration into the battery pack of the present invention. Both positioning plates may be identical to one another in geometric profile and dimensions. Therefore, only one plate is illustrated in this example, and is deemed sufficient for the purposes of discussion and to avoid redundancy in the description. However, the positioning plates are not required to be identical in order to practice the present invention. It is noted that one plate may have one or more features not present in the opposing plate without departing from the spirit and scope of the present invention.

Plate 100 has a length, a width, and a thickness dimension suitable for integrating multiple batteries into a formation for integration such that all of the batteries in the formation are constrained into the formation at each end of the formation by the positioning plates. Generally speaking, a positioning plate would be provided at both ends of the intended battery formation in order to achieve integrity in the formation and to constrain the batteries in the formation from moving or drifting within the battery pack.

Positioning plate 100 is fabricated from an electrically insulating material such as a polymer material. Other materials may be used provided they do not conduct electric current. In some embodiments materials with high thermal conductivity that may disperse heat are preferred. In some embodiments heat sink materials may be incorporated into or onto the positioning plates. In one embodiment, positioning plate 100 may be fabricated from a conductive material that is coated or laminated with a non-electrically conductive material. Anodized aluminum might be used to fabricate positioning plate 100 with all critical surfaces that might come in contact with electrical components such as battery terminals anodized or coated to eliminate conductivity. In most cases however, since an anodized coating may wear or age or corrode, a plastic or other polymer coating would be preferred. In any case, aluminum will provide rigidity and strength, but the surfaces need to be reliably non-conducting to serve the purpose.

Positioning plate 100 has a variety of features provided therein by design and fabrication such as by machining processes, or molding processes in case of a molded polymer application. In this example, positioning plate 100 includes multiple battery compartments 101 machined or otherwise provided therein through fabrication. In this example, battery compartments 101 are annular counter bores of a diameter just larger than the outside diameter of the batteries to be held in formation for integration. Battery compartments 101 are held to a specified depth so as not to break through the top surface of positioning plate 100, leaving enough plate thickness to accommodate an intermediate conductive component, which is described in more detail later in this specification.

Lithium-Ion batteries tend to swell when heated due to discharge or charging conditions. Therefore, the diameter of battery compartments 101 may be determined to accommodate for nominal battery swelling. Battery compartments 101 are fabricated on the underside or inside surface of positioning plate 100 relative to assembly orientation. In this way, the batteries are held in formation at each end of the formation (two opposing positioning plates). In this example, there are twelve battery compartments provided to arrange twelve annular batteries into a formation for integration. The exact formation and spacing between each compartment is not relevant to the invention as many different pattern arrangements and numbers of compartments may be provided. However, any pattern arrangement should be strategically implemented over the total surface area of the positioning plate as torque is applied to hold the plates together in alignment over the arrangement of batteries for integration.

In one embodiment, battery compartments 101 are adapted to hold annular Li-Ion batteries of size specification 18650 (18 mm diameter×65 mm long). Other diameters may be incorporated for annular batteries of other sizes. In one embodiment, non-conductive spacer cylinders may be incorporated to use the same battery positioning plate for batteries of a smaller diameter. In another embodiment, compartments 101 are prismatic or rectangular to hold Lithium Ion Polymer (LiPo) batteries fabricated in a variety of prismatic or rectangular shapes. A design supporting prismatic battery compartments would be dedicated to that type and shape of battery. In this example, the batteries are cylindrical Li-Ion batteries constrained in formation for integration.

Multiple through holes 102 are provided through positioning plate 100, one through hole at a center location of each battery compartment. Through holes 102 are provided to expose the terminal ends of each battery. In this example, Li-Ion batteries have terminals at each end, a positive terminal at one end and a negative terminal at the opposite end. An intermediate conductive component (not illustrated) is provided to affect frictional mechanical and electrical contact between the battery terminals of the Li-Ion batteries and printed circuit boards that are part of the assembly of the battery pack and that are described in more detail later in this specification. In one embodiment, the intermediate conductive component is a multi-coil spring. Thus, through holes 102 have an inside diameter that is sufficiently larger than the outside diameter of the spring serving as the intermediate conductive component in one embodiment.

Positioning plate 100 includes multiple rectangular recesses 103 machined or otherwise fabricated therein to a sufficient depth and rectangular dimension to accommodate a contact pad and battery protection circuitry form factor adapted to fit within the recess. Battery protection circuitry on the printed circuit board protects against battery over voltage, under voltage, and over current conditions in one embodiment. In this example, the batteries are primary batteries integrated in parallel and that are not charged. However, that should not be construed as a limitation to the practice of the present invention, as in some embodiment, the batteries may be secondary (rechargeable) batteries connected in series and may be subject to charging conditions.

Positioning plate 100 includes one or more cutouts 106 provided through the plate wall, which align to similar cutouts on the PCB attached to the plate. These cutouts function to dissipate heat and/or to provide plug-connection access to an electronic device from outside the assembled battery pack, such as a smart phone, for example, that may be nested within the battery back for charging. Positioning plate 100 includes multiple counter bores 104 machined or otherwise provided therein to a sufficient depth and diameter to accommodate mounting bosses attached to or otherwise formed on the PCB that serve as positioning bosses for mounting the PCB to the top surface of positioning plate 100.

Through holes 107 provided a at substantial center of each counter bore 104 are of sufficient diameter to accept bolts used to attach the PCB to position plate 100 from the underside of the plate. The bosses on the PCB are threaded to accept the bolts. In this embodiment there are 12 bolt holes 107 strategically arrayed over the surface of plate 100 to aid in equal distribution of torque across the assembly surface. Positioning plate 100 includes multiple through holes 105 having a diameter held sufficient to accept mounting bolts for holding both sides (opposing positioning plates and associated PCBs) together over cylindrical spacers that are threaded at both ends to accept the bolts. More detail regarding the assembly of the battery pack of the present invention is provided later in this specification.

As was described further above, recesses 103 within the nonconductive positioning plates can also be used to constrain additional electronic components on the PCB. These constraints are useful for issues including high-vibration environments, thermal coupling and control, controlling user exposure to dangerous voltages and/or currents, electrical isolation, and elegant packaging. Locating as much critical, sensitive and safety-related electronics on the side of the PCB that directly faces the nonconductive battery frame is beneficial to the overall design and performance of the battery integration module, especially since potentially high currents and voltages can be involved.

In this example, positioning plate 100 is a rectangular or square plate. However, other geometric shapes may be incorporated used without departing from the spirit and scope of the invention. Moreover, relief features or patterned cutouts may be provided about the edges of plate 100 where needed and according to various design requirements. Other recessed features or cutouts for accommodating battery-side circuitry presented by a PCB may be provided in this example without departing from the spirit and scope of the present invention. The exact configuration for accommodating various protection circuits, chips, and other circuitry is a matter of design preference and has no bearing on the practice of the invention.

Figure 2:
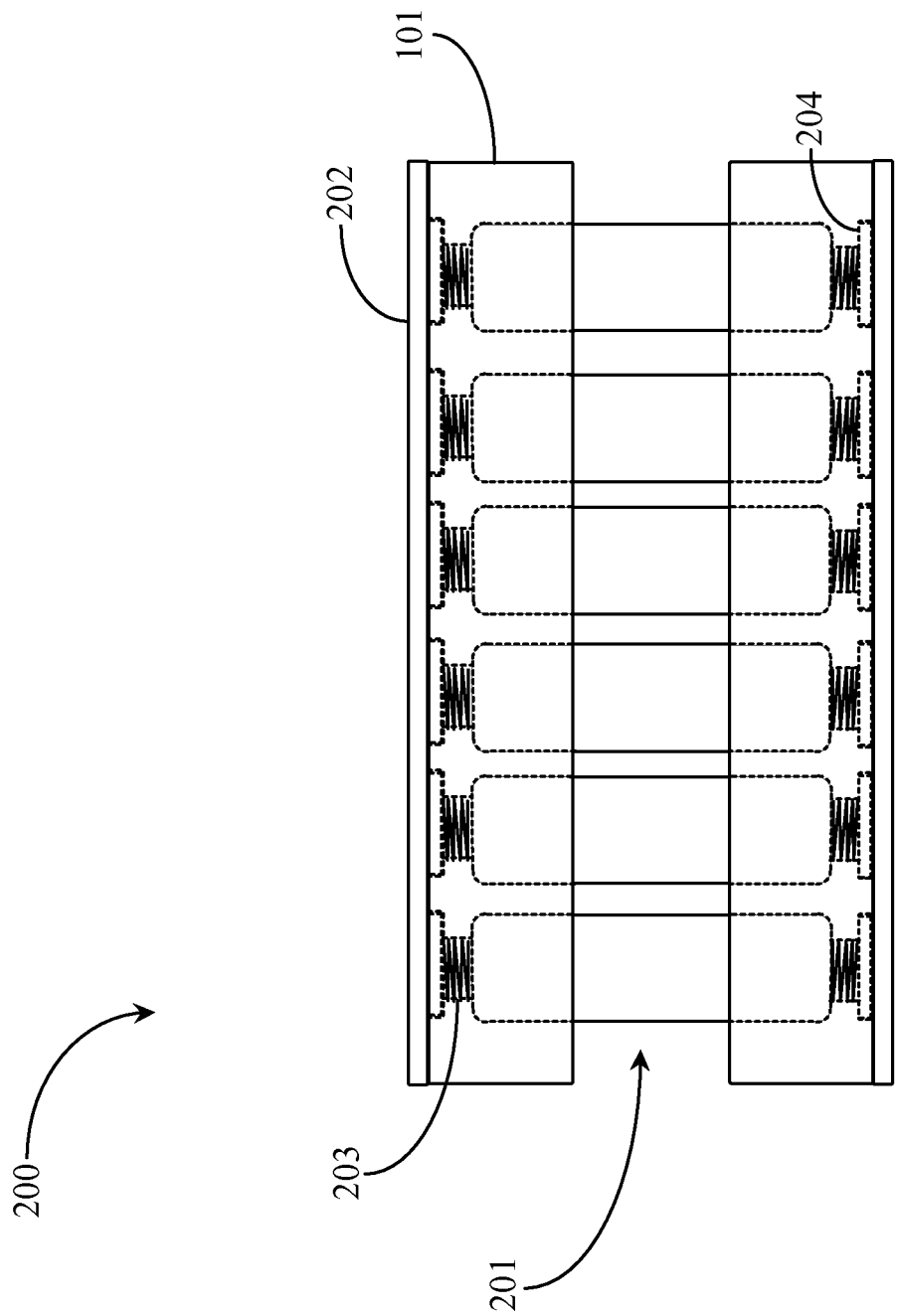
FIG. 2 is an elevation view of a battery integration module according to the embodiment of FIG. 1.

FIG. 2 is an elevation view of a battery integration module 200 according to the embodiment of FIG. 1. Battery integration module 200, also termed a battery pack in this specification, comprises two opposing PCBs 202, one on each side of the assembly. Plates 101 are depicted in assembled position over batteries 201 arranged in the assembly for integration. In this view, PCBs 202 include multiple battery-side contact pads 204 affixed to or otherwise formed on the PCBs that fit within the recesses (103) in plates 100 described further above. Contact pads 204 are conductive and may be formed of copper or other conductive materials. Contact pads 204 may be coated to inhibit oxidation and corrosion. Contact pads 204 may include battery protection circuits described further above that protect against voltage and current anomalies.

Batteries 201 are arranged in formation and constrained by opposing battery compartments (101) described with respect to FIG. 1 above. Battery terminals of batteries 201 are not coupled to or otherwise hard wired to any connectors at the vicinity of contact pads 204. Rather, an intermediate conductive component 203 is provided between each battery end and each contact pad 204 that makes frictional contact with a battery terminal at one end and a contact pad at the opposite end. Positive electrical contact between a battery and a contact pad is achieved through compression of intermediate conductive component 203 via tightening the positioning plates with attached PCBs over a set of cylindrical spacers to form a torque-adjustable battery holder frame.

In this example, conductive components 203 are springs made from a conductive material. In another embodiment the conductive components may be compressible clips or shims made of spring steel. In this case the shims or clips are loosely constrained and not mechanically coupled or connected to terminals or PCB contact pads. When compression is insufficient to make contact the intermediate component is loosely constrained. When compression is sufficient to make contact, the intermediate component remains in a state of physical compression causing a functional conductive bridge enabling electron flow between the battery terminals and the PCB contact pads. Cylindrical spacers are provided to ensure that the conductive components are not accidentally overly compressed, which can lead to damage or deformation of the conductive component.

In one embodiment, color-code fasteners such as the twelve screws used to mount the PCB to the positioning plate can be used to alert the user to the intended battery polarities in the non-conductive battery holder frame. In one example implementation, red-anodized aluminum screws might be used to hold the positive non-conductive positioning plate to its PCB, and blue-anodized aluminum screws might be used to hold the negative nonconductive positioning plate to its PCB. The visible colored screws serve as an alert to the user to ensure the proper installation of batteries into the battery pack. This is best implemented in those cases where all the batteries are aligned in a same direction within the non-conductive battery holder frame.

It is noted herein that the ideal range of compression of the conductive component is a design preference and depends partly on the type of physical component used as a bridge. The design of the battery frame incorporates the desired conductive component compression parameters. As a group, contact pads 204 may be connected to one another by diode-Oring interconnection method. This may be accomplished by coupling each contact pad to a contact path with a diode. For example, a diode may be used when connecting all of the positive terminals of all the batteries in parallel. The negative terminals can be integrated in parallel using a resistor in place of a diode.

In one embodiment another type of fuse might be employed in protection circuitry implemented at the location of the conductive pads. In preferred embodiments, the intermediate conductive contact, in this case a spring, is never soldered or in any other way permanently attached to the PCB. This aids in more efficient assembly of the battery pack and avoids various thermal and other issues that might arise because of a permanent connection. In one embodiment, appropriate surfaces on the PCB are gold-plated to reduce problems with corrosion and with the prospect of dissimilar metals touching one another.

Figure 3:
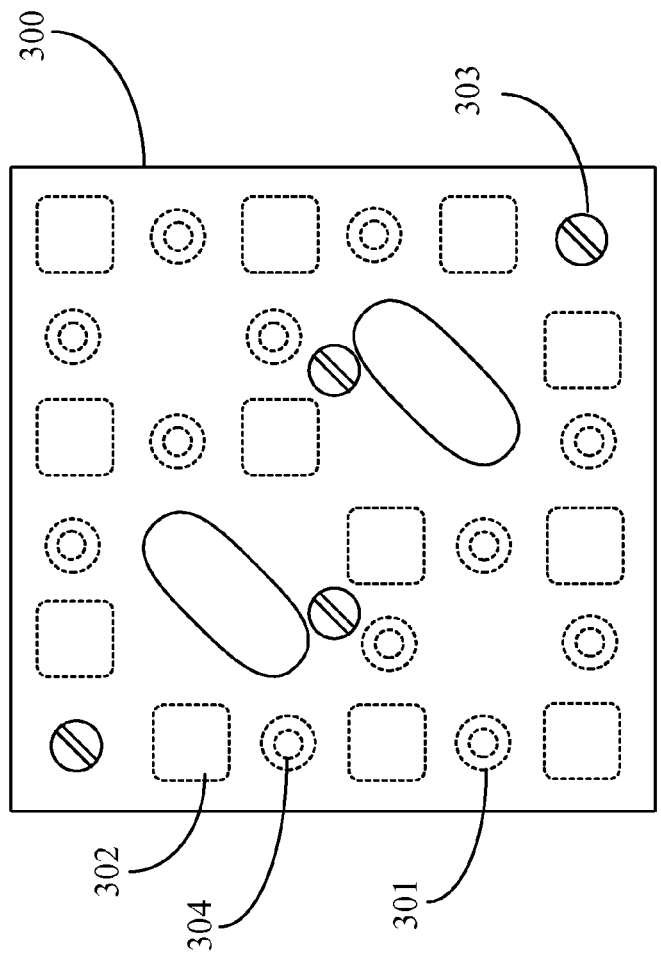
FIG. 3 is a top view of a printed circuit board removably attachable to the positioning plate of FIG. 1.

FIG. 3 is a top view of a printed circuit board 300 removably attachable to the positioning plate of FIG. 1. PCB 300 includes twelve contact pads 302 located on the underside of the PCB in this view. Contact pads 302 are analogous to contact pads 204 described further above. In this example there are twelve bosses 301 located in a specific pattern on the underside or "battery side" of the PCB. The bosses' function is as a position locator, the bosses seated into counter bores (104) on the positioning plate described relative to FIG. 1. Each boss 301 has a blind opening 304 provided therein that is threaded to accept a mounting bolt. In this example there are twelve bosses and twelve bolts are used to mount the PCB onto the positioning plate. In this example, the bolts are inserted from the underside of the positioning plate using through holes 107.

Screws 303 are provided to tighten the battery holder frame together over cylindrical spacers in the assembly. In this example there are four tightening screws or compression screws. There may be more or fewer screws used without departing from the spirit and scope of the present invention. The exact number used depends on design preferences. In one embodiment, lever fasteners can be used in place of screws where the levers include a cam body and hook the grabs onto a bar provided on the positioning plate such that operating the lever causes the frame to be compressed to a certain specified torque, which is the same every time for all of the incorporated levers.

Figure 4:
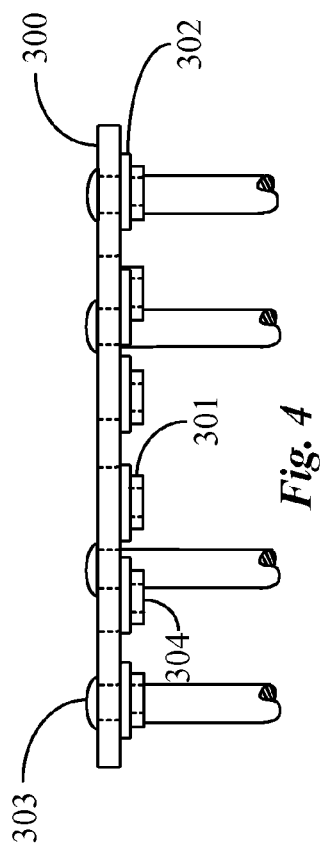
FIG. 4 is a side view of the printed circuit board of FIG. 3.

FIG. 4 is a side view of printed circuit board 300 of FIG. 3. In this view, PCB 300 is tightened over cylindrical spacers 401, which are provided to ensure that the intermediate conductive components are not overly compressed. Spacers 401 have dual threaded ends, which are adapted to accept torque screws 303 at opposite ends of the battery back assembly. Also in this view, conductive pads 302 are visible as well as positioning bosses 301 with threaded openings 304 for accepting the mounting bolts to attach the PCB to the associated positioning plate.

In one embodiment, each spring terminal is constrained so that it is always directly above its associated contact pad on the PCB. This feature may be implemented within the battery frame (assembled positioning plates). In this way, the spring or other intermediate conductive component is always correctly located adjacent to its contact pad on the PCB. In one embodiment, each conductive intermediate component, such as a spring component, is urged against the PCB with a predetermined amount of force. This force is in addition to the force that the intermediate component exerts against the PCB contact pad when the battery is in position. The additional force that may be provided by a spring compression retainer or the like ensures that the intermediate conductive component is always forced against its associated contact pad regardless of battery presence or non-presence in the assembly. This redundancy helps to ensure a good electrical contact between the battery and the PCB that is not subject to contact problems due to too little force exerted or due to uneven torque applied over the surface area of the battery pack.

It will be appreciated by the skilled artisan that in parallel-connected applications where no battery charging is provided, secondary battery cells may be connected in parallel and may be used only in discharge mode. Like primary batteries, secondary battery cells may be incorporated because of better energy or power density compared to available primary batteries available. In this case the only real safety concern is over current discharge. Therefore, the cells are connected in a diode-OR fashion so that no shorted cell can affect any of the other cells.

It is noted that Diode-ORing batteries together in series prevents them from being charged, as the diode will block any charging current attempting to enter the battery. In this case, a reliable safety system can be provided by simply choosing diodes that are rated at less than each cells' maximum short-circuit current. For example, if the cells are rated at 6A, diode-ORing each cell to the pack using a 3A diode ensures that in the event of over current conditions, the diode will blow open and the cell will be isolated from the rest of the cells the pack.

Conversely, a positive temperature coefficient (PTC) thermistor can implement a similar function when used in conjunction with the diode. The diode provides diode-OR connectivity across the cells in parallel, and the series-connected PTCs (one for each diode) provide a re-settable disconnect in the event of thermal overload due to over currents. In such a configuration, the PTC current rating must be less than that of the diode.

It will be apparent to one with skill in the art that the battery integration module or battery pack of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A battery pack comprising:

a first non-conductive positioning plate having a length, width and thickness, a first number of cylindrical counter-bores, in a first surface of the positioning plate, the counter-bores having center-lines at right angles to the first surface, arranged in a pattern and of a first diameter to engage one end of each of a plurality of batteries, the counter-bores each having a first depth less than one-half the length of an engaged battery and less than the thickness of the positioning plate, a second number of recesses of a specific common shape and a second depth in an opposite second surface of the positioning plate from the first surface, each recess aligned on the centerlines of the counter bores, and round holes of a common second diameter on the centerlines through from each of the counter-bores in the first surface to the recesses in the second surface, the second diameter of the round holes less than the first diameter of the counter-bores, each round hole opening fully within the shape of the recesses in the second surface;

a second non-conductive positioning plate a mirror-image of the first positioning plate;

a first printed circuit board (PCB) having a length and width equal to that of the first positioning plate and a first flat surface with a pattern of raised conductive contact pads having the shape of the recesses in the second surface and a height equal to or less than the depth of the recesses, the raised contact pads matching the positions of the recesses on the second surface of the first positioning plate;

a second printed circuit board (PCB) a mirror image of the first printed circuit board; and a plurality of coil springs equal to twice the number of the plurality of batteries, each coil spring having an outside diameter less than the diameter of the round holes, and a common length when not compressed;

wherein the first and second positioning plates engage the plurality of batteries at opposite ends with the positioning plates fastened together to form a battery pack, the first and second printed circuit boards are joined to the outside surfaces of the positioning plates with the raised conductive contact pads engaged in the recesses in the surfaces of the positioning plates, and wherein the coil springs are constrained in the round holes, one end of each coil spring contacting a battery terminal and the opposite end of each coil spring contacting a raised conductive contact pad on one of the printed circuit boards, providing electrical contact between the raised conductive contact pads of the printed circuit boards and terminals of the plurality of batteries, such that each battery in the battery pack is constrained between two partially compressed coil springs.

2. The battery pack of claim 1, wherein the batteries are interconnected in parallel.

3. The battery pack of claim 1, wherein the batteries are connected in series.

4. The battery pack of claim 1, wherein the two positioning plates are held together by spacers and machine screws, wherein compression on the multi-coiled springs provides tension that is mitigated by adjusting the machine screws and spacers.

5. The battery pack of claim 1, wherein diodes or circuits are employed in the PCB boards to polarize the current path to ensure a unidirectional placement of the batteries.

6. The battery pack of claim 1, further including one or more conductive or non-conductive heat sinks, the heat sinks isolated from battery terminals.

7. The battery pack of claim 1, wherein the contact surfaces of the PCBs are gold plated.

8. The battery pack of claim 1, further including heat protection and monitoring circuitry on the PCBs for each battery.

9. The battery pack of claim 8, wherein the heat protection and monitoring circuitry includes a fuse.

10. The battery pack of claim 9, wherein the fuse is a positive temperature coefficient (PTC) fuse.

11. The battery pack of claim 9, wherein the fuse is a diode.

* * * * *